(12) United States Patent
Hong et al.

(10) Patent No.: US 10,865,307 B2
(45) Date of Patent: Dec. 15, 2020

(54) POLYMERIZABLE COMPOSITION FOR PLASTIC LENS AND METHOD OF PREPARING PLASTIC LENS USING SAME

(71) Applicant: SKC CO., LTD., Suwon-si (KR)

(72) Inventors: Seung Mo Hong, Incheon (KR); Jung Hwan Myung, Seoul (KR); Junghwan Shin, Suwon-si (KR)

(73) Assignee: SKC CO., LTD., Suwon-si (KR)

( * ) Notice: Subject to any disclaimer, the term of this patent is extended or adjusted under 35 U.S.C. 154(b) by 128 days.

(21) Appl. No.: 15/887,177

(22) Filed: Feb. 2, 2018

(65) Prior Publication Data
US 2018/0224576 A1 Aug. 9, 2018

(30) Foreign Application Priority Data
Mar. 2, 2017 (KR) .................. 10-2017-0015463

(51) Int. Cl.
*C08G 75/04* (2016.01)
*C08L 75/04* (2006.01)
(Continued)

(52) U.S. Cl.
CPC .............. *C08L 75/04* (2013.01); *B29C 35/02* (2013.01); *C08F 2/01* (2013.01); *C08G 18/242* (2013.01);
(Continued)

(58) Field of Classification Search
CPC ... C08L 75/04; C08G 18/7642; C08G 18/246; C08G 18/242; C08G 75/0268; C08G 75/045; C08G 18/3876; C08G 18/089; C08G 18/24; C08G 18/35855; C08K 5/098; C08K 5/07; G02B 1/04; G02B 1/041;
(Continued)

(56) References Cited

U.S. PATENT DOCUMENTS 3,972,846 A * 8/1976 Mori .................. C08G 18/089
528/85
9,482,787 B2 * 11/2016 Kawato .............. C08G 18/7642
(Continued)

FOREIGN PATENT DOCUMENTS

JP 7-286027 A 10/1995
JP 2005338109 A * 12/2005
(Continued)

OTHER PUBLICATIONS

Japanese Patent Office; Communication dated Dec. 18, 2018 in counterpart JP application No. 2018-017146.
(Continued)

*Primary Examiner* — Sanza L. McClendon
(74) *Attorney, Agent, or Firm* — Sughrue Mion, PLLC

(57) ABSTRACT

An embodiment relates to a polymerizable composition for a plastic lens. The polymerizable composition for a plastic lens according to the embodiment comprises a nonhalogenated tin-based catalyst and a diketone compound as a low-temperature reaction rate controlling agent. Accordingly, the polymerizable composition has a more stable pot life so that the polymerization rate can be appropriately controlled, thereby improving the reactivity and the workability, and that the generation of bubbles are prevented, thereby improving the transparency of the resin.

17 Claims, 2 Drawing Sheets

(51) Int. Cl.
    *C08K 5/07*     (2006.01)
    *C08G 18/38*     (2006.01)
    *C08G 18/76*     (2006.01)
    *C08G 18/24*     (2006.01)
    *G02B 1/04*     (2006.01)
    *B29C 35/02*     (2006.01)
    *C08F 2/01*     (2006.01)
    *C08G 75/0268*     (2016.01)
    *C08G 75/045*     (2016.01)
    *B29K 81/00*     (2006.01)
    *B29L 11/00*     (2006.01)

(52) U.S. Cl.
    CPC ....... *C08G 18/246* (2013.01); *C08G 18/3876* (2013.01); *C08G 18/7642* (2013.01); *C08G 75/0268* (2013.01); *C08G 75/045* (2013.01); *C08K 5/07* (2013.01); *G02B 1/04* (2013.01); *B29K 2081/00* (2013.01); *B29L 2011/0016* (2013.01); *G02B 1/041* (2013.01)

(58) Field of Classification Search
    CPC ............... B29C 35/02; B29D 11/00009; B29L 2011/0016
    See application file for complete search history.

(56) References Cited

U.S. PATENT DOCUMENTS

2011/0112269 A1     5/2011     Iwazumi et al.
2014/0107314 A1     4/2014     Kawato et al.

FOREIGN PATENT DOCUMENTS

JP     2005338109 A     12/2005
JP     2007246690 A     9/2007
KR     10-1207128 B1     11/2012

OTHER PUBLICATIONS

Korean Patent Office; Communication dated Sep. 8, 2017 in counterpart application No. 10-2017-0015463.
Korean Patent Office; Communication dated Nov. 27, 2017 in counterpart application No. 10-2017-0015463.
European Patent Office, Communication dated Jun. 26, 2018 in counterpart European application No. 18154528.6.
Database WPI: "Plastic Lens Sunglasses Base Material Laminate Hard Coat Layer Forming Polymerise Cure Composition Contain Composite Inorganic Oxide Microparticles Compound"; Seiko Epson Corp.; 2005, XP002781084, 3 pages.

* cited by examiner

[Fig. 1]
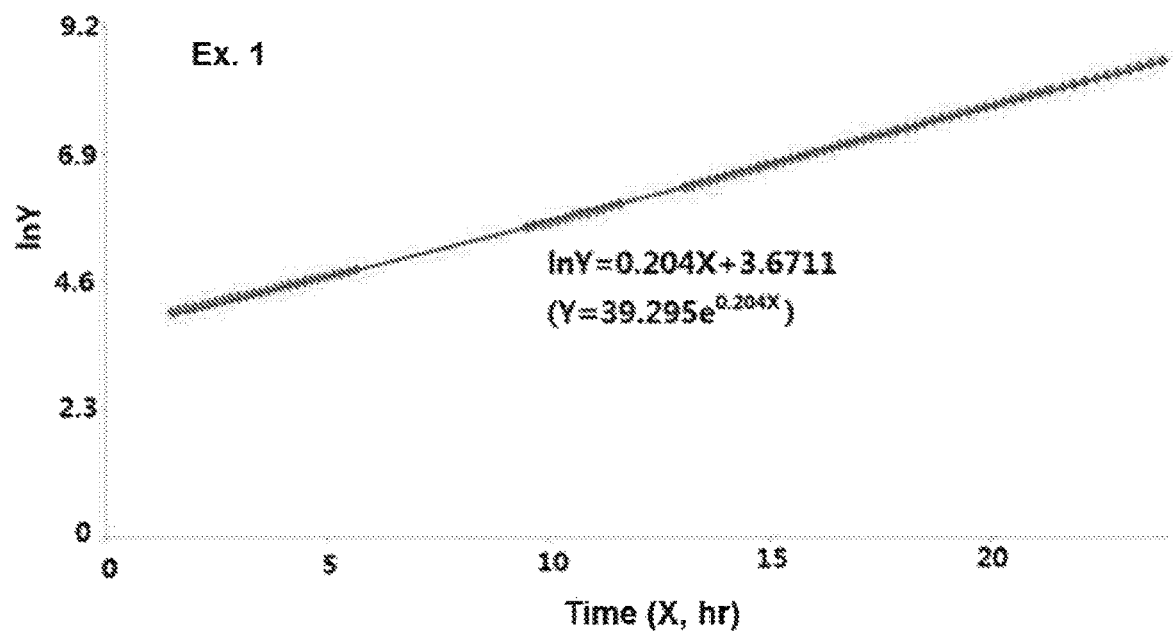
[Fig. 2]
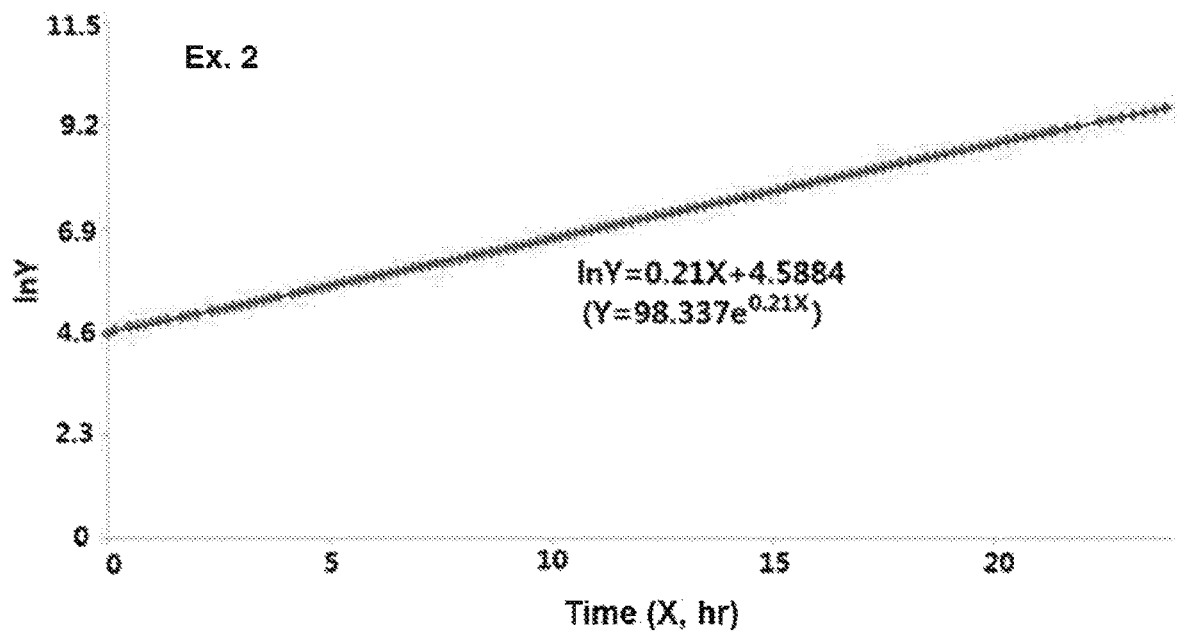

[Fig. 3]
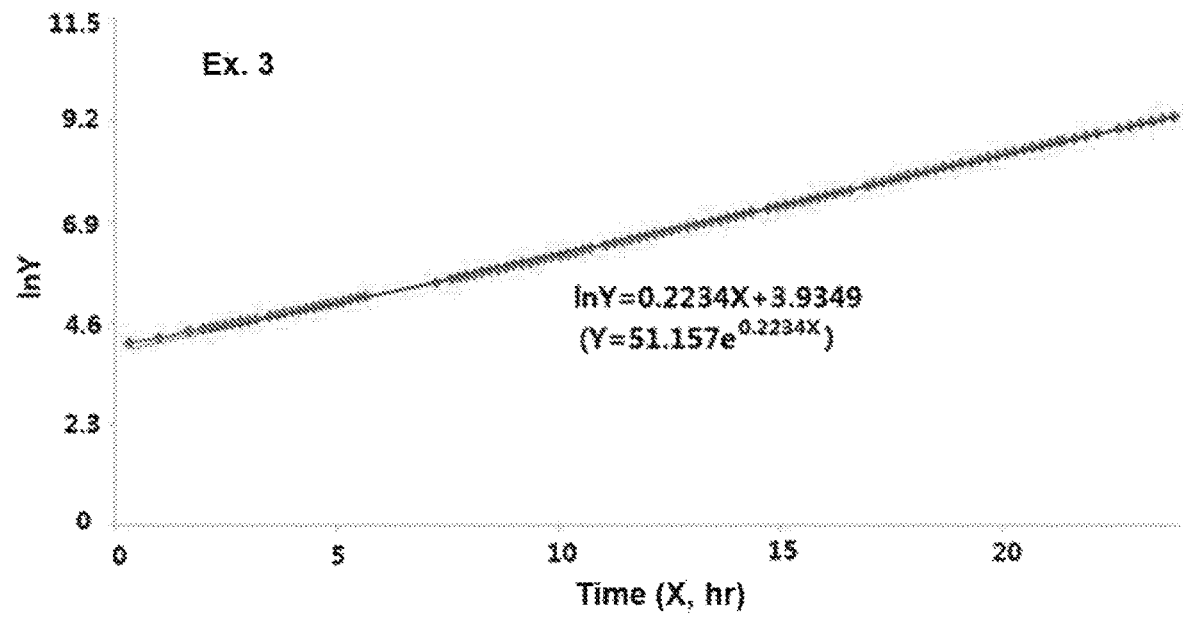
[Fig. 4]
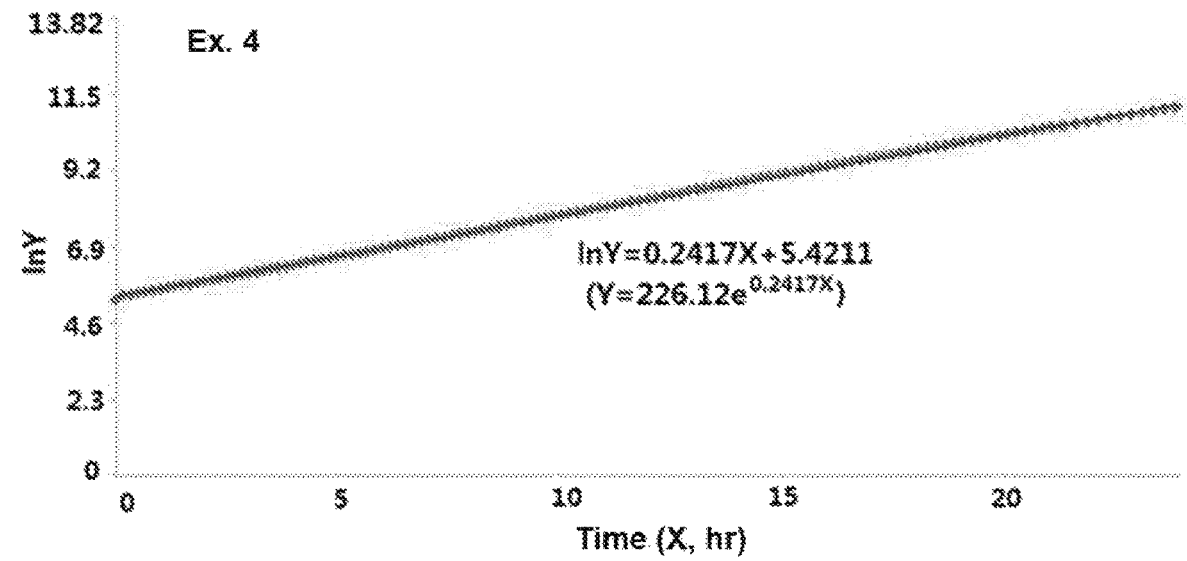

POLYMERIZABLE COMPOSITION FOR PLASTIC LENS AND METHOD OF PREPARING PLASTIC LENS USING SAME

TECHNICAL FIELD

An embodiment relates to a polymerizable composition for a plastic lens and a process for preparing a polythiourethane-based plastic lens using the same.

BACKGROUND ART

Plastic optical materials are lightweight, hardly breakable, and excellent in dyeability as compared with optical materials made of inorganic materials such as glass. Therefore, plastic materials of various resins are widely used as optical materials for eyeglass lenses, camera lenses, and so on. In recent years, there has been an increased demand for higher performance of optical materials, particularly in terms of high transparency, high refractive index, low specific gravity, high heat resistance, and high impact resistance. A polythiourethane-based compound is widely used as an optical material by virtue of its excellent optical features and excellent mechanical properties.

In general, a polythiourethane-based compound is prepared by a casting polymerization method in which a polymerizable composition is injected into a mold and thermally cured. In such event, the polymerization reaction is carried out over several hours to tens of hours while the temperature is gradually elevated from a low temperature to a high temperature. Here, it is critical to secure a sufficient time for the casting—that is, a sufficient pot life—in order to improve the workability. Further, in order to sufficiently materialize the resin properties, it is necessary to complete the polymerization. In order to complete the polymerization, for example, a catalyst having a strong polymerization activity may be used, or an increased amount of a catalyst may be used. In order to achieve stable polymerizability, it is important to secure a stable pot life even in different lots. If the pot life varies from lot to lot, polymerization deviations may occur, which may affect the quality stability of the resin.

Commonly used catalysts include halogenated tin-based catalysts, amine-based catalysts, and the like.

Although the halogenated tin-based catalysts have been most widely used since they meet the above-mentioned requirements, they are not actively used nowadays in many manufacturing industries due to their high toxicity to the human body. Therefore, attempts have been made to use nonhalogenated tin-based catalysts. However, it is difficult to use the nonhalogenated tin-based catalysts because they have a relatively low acidity and a high reactivity such that they cannot secure a sufficient pot life and maintain the quality stability. Thus, efforts to find a substitute for the halogenated, tin-based catalysts have continued. For example, Korean Patent No. 1207128 discloses a process for polymerization in which an amine-based hydrochloride is employed as a catalyst.

PRIOR ART DOCUMENT

Patent Document (Patent Document 1) Korean Patent No. 1207128

DISCLOSURE OF INVENTION

Technical Problem

However, a lens prepared using the amine-based catalyst disclosed in Korean Patent No. 1207128 has a problem that it has a slight color. Thus, a blue dye should be mixed in a relatively large amount to deal with this problem, which results in another problem that the total transmittance is reduced.

Accordingly, in an embodiment, a nonhalogenated tin-based catalyst is employed so as to provide a polymerizable composition that is harmless to the human body and has a more stable pot life, along with a diketone compound as a reaction rate controlling agent for the purpose of controlling the reactivity of the catalyst. As the reaction rate and the viscosity are properly controlled by way of controlling the reactivity of the nonhalogenated catalyst, there are provided a polymerizable composition for a plastic lens having high transparency, which is an advantage of a glass lens, and improved workability, and a polythiourethane-based plastic lens prepared therefrom.

Solution to Problem

An embodiment provides a polymerizable composition for a plastic lens, which comprises a bi- or higher functional isocyanate compound, a bi- or higher functional thiol compound having at least one sulfide bond or at least one ester bond, a catalyst, and a diketone-based low-temperature reaction rate controlling agent.

The low-temperature reaction rate controlling agent may be a diketone compound.

The catalyst may be a nonhalogenated tin-based catalyst.

The polymerizable composition according to the embodiment comprises a bi- or higher functional isocyanate compound; a bi- or higher functional thiol compound having at least one sulfide bond or at least one ester bond; a catalyst; and a low-temperature reaction rate controlling agent, and satisfies the following Equation 1, when the changes in viscosity (Y) are measured with respect to time (X) at 10° C.:

$$\Delta \ln Y = b \times \Delta X \qquad \text{[Equation 1]}$$

Wherein, $\Delta \ln Y$ is $\ln Y_X - \ln Y_0$, $Y_0$ is the initial (x=0) viscosity (cps) of the polymerizable composition at a temperature of 10° C., $Y_X$ is the viscosity (cps) of the polymerizable composition at a temperature of 10° C. after X hour(s) elapse, $\Delta X$ is from 0.01 hour to 30 hours, and b is from 0.1 hour$^{-1}$ to 0.5 hour$^{-1}$.

The process for preparing a plastic lens according to an embodiment comprises providing a polymerizable composition for a plastic lens, which comprises a bi- or higher functional isocyanate compound, a bi- or higher functional thiol compound having at least one sulfide bond or at least one ester bond, a catalyst, and a diketone-based low-temperature reaction rate controlling agent; and thermally curing the polymerizable composition in a mold.

Advantageous Effects of Invention

The polymerizable composition for a plastic lens according to an embodiment comprises a low-temperature reaction rate controlling agent. Specifically, the polymerizable composition for a plastic lens according to the embodiment may comprise a nonhalogenated tin-based catalyst and a diketone compound. Accordingly, the polymerizable composition according to the embodiment has a more stable pot life so that the polymerization rate can be appropriately controlled, thereby improving the reactivity and the workability, and that the generation of bubbles are prevented, thereby improving the transparency of the resin. Particularly, the polymerizable composition for a plastic lens according to the embodiment can control the reaction rate at low temperatures and can thus prevent such optical nonuniformity as a cord that may otherwise be caused by a vigorous reaction at low temperatures. In addition, since the nonhalogenated tin-based catalyst is harmless to the human body, the polymerizable composition according to the embodiment is useful for manufacturing various plastic lenses such as eyeglass lenses and camera lenses.

BRIEF DESCRIPTION OF THE DRAWINGS

FIGS. 1 to 4 are graphs that show the changes in viscosity (Y) of the polymerizable compositions prepared in Examples 1 to 4 as measured at 10° C. for time (X) using a non-contact viscometer, which are represented in a logarithmic scale.

BEST MODE FOR CARRYING OUT THE INVENTION

An embodiment provides a polymerizable composition for a plastic lens, which comprises a bi- or higher functional isocyanate compound, a bi- or higher functional thiol compound having at least one sulfide bond or at least one ester bond, a catalyst, and a diketone-based low-temperature reaction rate controlling agent.

The polymerizable composition according to the embodiment comprises a bi- or higher functional isocyanate compound, a bi- or higher functional thiol compound having at least one sulfide bond or at least one ester bond, a catalyst, and a diketone-based low-temperature reaction rate controlling agent.

The polymerizable composition according to the embodiment comprises a bi- or higher functional isocyanate compound, a bi- or higher functional thiol compound having at least one sulfide bond or at least one ester bond, a catalyst, and a low-temperature reaction rate controlling agent, and satisfies the following Equation 1, when the changes in viscosity (Y) are measured with respect to time (X) at 10° C.:

$$\Delta \ln Y = b \times \Delta X \quad \text{[Equation 1]}$$

wherein $\Delta \ln Y$ is $\ln Y_x - \ln Y_0$, $Y_0$ is the initial (x=0) viscosity (cps) of the polymerizable composition at a temperature of 10° C., $Y_X$ is the viscosity (cps) of the polymerizable composition at a temperature of 10° C. after X hour(s) elapse, $\Delta X$ is from 0.01 hour to 30 hours, and b is from 0.1 hour$^{-1}$ to 0.5 hour$^{-1}$.

The bi- or higher functional isocyanate compound may be 1,3-bis(isocyanatomethyl)cyclohexane, 1,4-bis(isocyanatomethyl)cyclohexane, bis(4-isocyanatocyclohexyl)methane, bis(isocyanatomethyl)-bicyclo[2.2.1]heptane, isophorone diisocyanate, m-xylene diisocyanate, hexamethylene diisocyanate, pentamethylene diisocyanate, toluene diisocyanate, or a mixture thereof. Specifically, it may be m-xylene diisocyanate, 1,3-bis(isocyanatomethyl) cyclohexane, or a mixture thereof.

The bi- or higher functional thiol compound having at least one sulfide bond may be 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 4-mercaptomethyl-1,8-dimercapto-3,6-dithiooctane, bis (mercaptoethyl) sulfide, 2,5-bis(mercaptomethyl)-1,4-dithiane, 1,1,3,3-tetrakis(mercaptomethylthio)propane, 4,6-bis (mercaptomethylthio)-1,3-dithiane, 2-(2,2-bis (mercaptomethylthio)ethyl)-1,3-dithiaethane, 1,2-bis[(2-mercaptoethyl)thio]-3-mercaptopropane, or a mixture thereof.

Specifically, it may be 4,8-dimercaptomethyl-1,11-dimercapto-3,6,9-trithiaundecane, 4,7-dimercaptomethyl-1, 11-dimercapto-3,6,9-trithiaundecane, 5,7-dimercaptomethyl-1-1,11-dimercapto-3,6,9-trithiaundecane, 1,2-bis[(2-mercaptoethyl)thio]-3-mercaptopropane, or a mixture thereof.

More specifically, it may be a mixture of 4,8-dimercaptomethyl-1,11-dimercapto-3,6,9-trithiaundecane, 4,7-dimercaptomethyl-1-1,11-dimercapto-3,6,9-trithiaundecane, and 5,7-dimercaptomethyl-1,11-dimercapto-3,6,9-trithiaundecane, or 1,2-bis[(2-mercaptoethyl)thio]-3-mercaptopropane.

The bi- or higher functional thiol compound having at least one ester bond may be trimethylpropane tri(3-mercaptoacetate), trimethylpropane tri(3-mercaptopropionate), pentaerythritol tetrakis(2-mercaptoacetate), pentaerythritol tetrakis(3-mercaptopropionate), dipentaerythritol hexa(3-mercaptoacetate), dipentaerythritol hexa(3-mercaptopropionate), or a mixture thereof.

Specifically, it may be pentaerythritol tetrakis(2-mercaptoacetate pentaerythritol tetrakis(3-mercaptopropionate), or a mixture thereof.

The catalyst may comprise a nonhalogenated tin-based catalyst, which does not comprise a halogen. The nonhalogenated tin-based catalyst may be a dialkyltin dicarboxylate, which includes dimethyltin diacetate, dibutyltin dioctanoate, and dibutyltin dilaurate; a dialkyltin dialkoxide, which includes dibutyltin dibutoxide and dioctyltin dibutoxide; a dialkyltin dithioalkoxide, which includes dibutyltin di(thiobutoxide); a dialkyltin oxide, which includes di(2-ethylhexyl)t n oxide, dioctyltin oxide, and bis(butoxy dibutyltin) oxide; a dialkyltin sulfide, which includes dibutyltin sulfide; or a mixture thereof.

Specifically, it may be dibutyltin dilaurate, dimethyltin diacetate, or a mixture thereof.

The low-temperature reaction rate controlling agent may control the reaction rate of the isocyanate compound and the thiol compound at a low temperature during the polymerization thereof.

The low-temperature reaction rate controlling agent may be a diketone-based low-temperature reaction rate controlling agent. Specifically, the diketone-based low-temperature reaction rate controlling agent may comprise a diketone compound. The low-temperature reaction rate controlling agent may have an activity of controlling the reaction rate at low temperatures. The low-temperature reaction rate controlling agent may reduce the reaction rate of the polymerizable composition. More specifically, the low-temperature reaction rate controlling agent may reduce the reaction rate of the polymerizable composition that is, the reaction rate of the isocyanate compound and the thiol compound—at a temperature of about 0° C. to about 50° C., about 0° C. to about 30° C., or at about 10° C.

The diketone compound may be acetylacetone, perfluoroacetylacetone, benzoyl-2-furanoyl methane, 1,3-bis(3-pyridyl)-1,3-propanedione, benzoyltrifluoroacetone, benzoylacetone, di(4-bromo)benzoylmethane, d,d-dicamphoryl methane, 4,4-dimethoxydibenzoylmethane, 2,6-dimethyl-3, 5-heptanedione, dinaphthoylmethane, dipivaloylmethane, di(perfluoro-2-propoxypropionyl)methane, 1,3-di(2-thienyl)-1,3-propanedione, 3-(trifluoroacetyl)-d-camphor, 6,6,6-trifluoro-2,2-dimethyl-3,5-hexanedione, 1,1,1,2,2,6,6,7,7,7-decafluoro-3,5-heptanedione, 6,6,7,7,8,8,8-heptafluoro-2,2-dimethyl-3,5-octanedione, 2-furyl trifluoroacetone, hexafluoroacetylacetone, 3-(heptafluorobutyryl)-d-camphor, 4,4,5,5,6,6,6-heptafluoro-1-(2-thienyl)-1,3-hexanedione, 4-methylbenzoyl-2-furanoyl methane, 6-methyl-2,4-heptanedione, 2-naphthoyl trifluoroacetone, 3-(5-phenyl-1,3,4-oxadiazol-2-yl)-2,4-pentanedione, 3-phenyl-2,4-pentanedione, pivaloyl trifluoroacetone, 1-phenyl-3-(2-thienyl)-1,3-propanedione, 3-(tert-butylhydroxymethylene)-d-camphor, trifluoroacetylacetone, 1,1,1,2,2,3,3,7,7,8,8,9,9,9-tetradecafluoro-4,6-nonanedione, 2,2,6,6-tetramethyl-3,5-heptanedione, 4,4,4-trifluoro-1-(2-naphthyl)-1,3-butanedione, 2,2,6,6-tetramethyl-3,5-octanedione, 2,2,6-trimethyl-3,5-heptanedione, 2,7-trimethyl-3,5-octanedione, 2-thenoyltrifluoroacetone, or a mixture thereof.

Specifically, it may be acetylacetone, perfluoroacetylacetone, benzoyl-2-furanoyl methane, or a mixture thereof.

A β-diketonate compound may be derived from the diketone compound. The β-diketonate compound controls the activity of the nonhalogenated tin-based catalyst to secure a sufficient pot life during the polymerization.

The nonhalogenated tin-based catalyst may be employed in an amount of 5 ppm or more, preferably 10 ppm or more, more preferably 50 ppm or more, even more preferably 100 ppm or more, based on the total weight of the isocyanate compound and the thiol compound. In addition, the upper limit may be 5,000 ppm or less, preferably 2,000 ppm or less, more preferably 1,000 ppm or less, in order to suppress the cloudiness or cord in a plastic lens and in consideration of the workability such as pot life and so on. Specifically, it may be 5 to 5,000 ppm, 5 to 2,000 ppm, 5 to 1,000 ppm, 10 to 5,000 ppm, 10 to 2,000 ppm, 10 to 1,000 ppm, 50 to 5,000 ppm, 50 to 2,000 ppm, 50 to 1,000 ppm, 100 to 5,000 ppm, 100 to 2,000 ppm, or 100 to 1,000 ppm.

In such event, the diketone compound may be employed in an amount of 5 to 90% by weight, specifically 10 to 80% by weight, based on the weight of the nonhalogenated tin-based catalyst. It is preferable to increase the amount of the diketone compound as the reaction rate becomes faster.

The polymerizable composition satisfies the following Equation 1, when the changes in viscosity (Y) are measured with respect to time (X) at 10° C.:

$$\Delta \ln Y = b \times \Delta X \quad \text{[Equation 1]}$$

Wherein, $\Delta \ln Y$ is $\ln Y_x - \ln Y_0$, $Y_0$ is the initial (x=0) viscosity (cps) of the polymerizable composition at a temperature of 10° C., $Y_x$ is the viscosity (cps) of the polymerizable composition at a temperature of 10° C. after X hour(s) elapse, $\Delta X$ is from 0.01 hour to 30 hours, and b is from 0.1 hour$^{-1}$ to 0.5 hour$^{-1}$ or from 0.1 hour$^{-1}$ to 0.3 hour$^{-1}$.

Referring to FIGS. 1 to 4, b stands for the slope of the graph when the changes in viscosity with respect to time is represented in a logarithmic scale. If b is within the above range, the polymerizable composition may have a viscosity of 20 to 200 cps, specifically 30 to 120 cps, at a temperature of 10° C. at the beginning of the polymerization, maintain the reactivity during the polymerization, and prevent the generation of bubbles. If the b value is excessively large, the changes in viscosity may abruptly increase, thereby generating bubbles. If the b value is too small, the reactivity decreases.

The polymerizable composition may further comprise such additives as an internal mold release agent, a heat stabilizer, an ultraviolet absorber, and a blueing agent, depending on the purpose thereof.

The internal mold release agent may include a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethylstearylammonium salt, dimethylethylcetylammonium salt, triethyldodecylammonium salt, trioctylmethylammonium salt, and diethylcyclohexadodecylammonium salt; and an acidic phosphate ester. It may be used alone or in combination of two or more.

As the heat stabilizer, a metal fatty acid salt, a phosphorus compound, a lead compound, or an organotin compound may be used alone or in combination of two or more.

As the ultraviolet absorber, benzophenone, benzotriazole, salicylate, cyanoacrylate, oxanilide, or the like may be used.

The blueing agent has an absorption band in the wavelength range from orange to yellow in the visible light region and has a function of adjusting the color of an optical material made of a resin. Specifically, the blueing agent may comprise a material that exhibits blue to violet color, but is not particularly limited thereto. In addition, examples of the blueing agent include a dye, a fluorescent whitening agent, a fluorescent pigment, and an inorganic pigment. It may be properly selected in accordance with the properties required for an optical component to be produced and the resin color. The blueing agent may be used alone or in combination of two or more.

In view of the solubility of the polymerizable composition and the transparency of the optical material to be produced, a dye is preferably used as the bluing agent. From the viewpoint of the absorption wavelength, the dye may particularly have a maximum absorption wavelength of 520 to 600 nm; and more particularly, a maximum absorption wavelength of 540 to 580 nm. Further, in terms of the structure of the compound, an anthraquinone-based dye is preferable as the dye. The method of adding the blueing agent is not particularly limited, and the blueing agent may he added to the monomers in advance. Specifically, various methods can be used; for example, the blueing agent may he dissolved in the monomers or may be contained in a master solution in a high concentration, the master solution being later diluted with the monomers or other additives and then added.

An embodiment provides a process for preparing a polythiourethane-based plastic lens by thermally curing the polymerizable composition as described above in a mold. According to the embodiment, the polythiourethane-based plastic lens may be prepared by the steps of providing a polymerizable composition for a plastic lens, which comprises a bi- or higher functional isocyanate compound, a bi- or higher functional thiol compound having at least one sulfide bond or at least one ester bond, a catalyst, and a diketone-based low-temperature reaction rate controlling agent; and thermally curing the polymerizable composition in a mold. Furthermore, an embodiment provides a polythiourethane-based plastic lens obtained by the preparation process as described above.

Specifically, the polymerizable composition is degassed under reduced pressures and then injected into a mold for molding a lens. Such degassing and mold injection may be carried out at a temperature of, for example, 20 to 40° C. Once the composition is injected into the mold, polymerization is usually carried out by gradually heating the composition from a low temperature to a high temperature.

The polymerization temperature may be, for example, 20 to 150° C., particularly 25 to 120° C.

Further, the polymerizable composition may be heated at a rate of 1° C./min to 10° C./min from an initial temperature between about 0 and about 30° C.

In addition, the polymerizable composition may be heated to a temperature of about 100 to about 150° C. at the above rate and then maintained for 5 to 30 hours.

Then, the polythiourethane-based plastic lens is released from the mold.

The polythiourethane-based plastic lens may have various shapes by changing the mold used in the production. Specifically, it may be in the form of an eyeglass lens, a camera lens, or the like.

If required, the plastic lens may be subjected to physical or chemical treatment such as surface polishing, antistatic treatment, hard coat treatment, anti-reflection coat treatment, dyeing treatment, and dimming treatment for the purpose of imparting thereto anti-reflection, hardness, abrasion resistance, chemical resistance, anti-fogging, or fashionity.

As described above, the polymerizable composition for a plastic lens according to the embodiment comprises a non-halogenated tin-based catalyst and a diketone compound as a low-temperature reaction rate controlling agent. It has a more stable pot life so that the polymerization rate can be appropriately controlled, thereby improving the reactivity and the workability, and that the generation of bubbles are prevented, thereby improving the transparency of the resin.

Particularly, the polymerizable composition for a plastic lens according to the embodiment can control the reaction rate at low temperatures and can prevent such optical nonuniformity as a cord that may otherwise be caused by a vigorous reaction at low temperatures. In addition, since the nonhalogenated tin-based catalyst is harmless to the human body, the polymerizable composition according to the embodiment is advantageously used for manufacturing various plastic lenses such as eyeglass lenses and camera lenses.

Hereinafter, the present invention is explained in detail by Examples. The following Examples are intended to further illustrate the present invention without limiting its scope.

EXAMPLE 1

Preparation of a Polymerizable Composition for a Plastic Lens 50.7 parts by weight of m-xylylene diisocyanate (XDI), 0.05 part by weight of dibutyltin dilaurate (DBTL) as a polymerization catalyst, 0.03 part by weight of acetylacetone, and 0.1 part by weight of Zelec®UN (acidic alkyl phosphate mold release agent; Stepan Company) as an internal mold release agent were mixed and dissolved at 20° C. Added thereto was 49.3 parts by weight of a mixture of tetrafunctional polythiol compounds comprising 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane that had been prepared in accordance with Example 1 of Japanese Laid-open Patent Publication No. Hei 7-252207. They were uniformly mixed to produce a polymerizable composition. Here, the polythiol compounds contained in the mixture are structural isomers with each other.

EXAMPLES 2 TO 4 AND COMPARATIVE EXAMPLES 1 TO 3

Preparation of Polymerizable Compositions

The same procedure as in Example 1 was carried out to produce polymerizable compositions for a plastic lens, except that the kinds and the amounts of the compounds were changed as shown in Table 1 below, Evaluation Example: Property Measurement The properties of the polymerizable compositions prepared in Examples 1 to 4 and Comparative Examples 1 to 3 were measured in accordance with the methods as described below. The measurement results are shown in Table 1 below, (1) Polymerization Rate The changes in viscosity ($\Delta \ln Y$) of the polymerizable compositions prepared in Examples 1 to 4 and in Comparative Examples 1 to 3 each were measured at 10° C. using a non-contact viscometer (EMS-1000, Kyoto Electronics Manufacturing Co., Ltd.). The relationship was represented as the following Equation 1 and shown graphically in FIGS. 1 to 4, wherein the X axis refers to time, the Y axis refers to viscosity, and the Y axis is represented in logarithmic scale:

$$\Delta \ln Y = b \times X.  \quad \text{[Equation 1]}$$

(2) Evaluation of Transparency (or Cloudiness)

Each of the polymerizable compositions prepared in Examples 1 to 4 and Comparative Examples 1 to 3 was degassed at 600 Pa for 1 hour and then filtered through a Teflon filter of 3 μm. The polymerizable composition thus filtered was injected into a glass mold assembled by tapes. The mold was heated from 25° C. to 120° C. at a rate of 5° C./min, and polymerization was carried out at 120° C. for 18 hours. Then, the cured resin in the glass mold was further cured at 130° C. for 4 hours, and the molded article (i.e., a plastic lens) was released from the glass mold. The lens thus prepared was evaluated for transparency by checking whether or not it was cloudy, as follows. Specifically, the lens was irradiated to a projector in a darkroom to visually observe whether the lens was cloudy or had any opaque material. If the lens neither was cloudy nor had any opaque material, it was evaluated as ○ (not cloudy). If it was cloudy or had any opaque material, it was evaluated as × (cloudy).

(3) Evaluation of Mold Releasability

The same method as in Item (2) above was used for the evaluation of mold releasability with a convex-type casting mold that had been assembled with glass molds having an outer diameter of 84 mm and a height of 17 mm and an outer diameter of 84 mm and a height of 11 mm, respectively, and tapes. 10 injections were carried out for the evaluation of each composition. Upon completion of the polymerization, the mold stood to be cooled to room temperature. If no mold was broken or cracked, it was evaluated as ○. If one or two molds were broken or cracked, it was evaluated as Δ. If three or more molds were broken or cracked, it was evaluated as ×.

(4) Evaluation of Bubble Generation

Each of the lenses prepared in Item (2) above was observed with a microscope at a magnification of 100 times. If the number of bubbles was 0 in the inside, the lens was evaluated as S. If the number was 1 to 10, it was evaluated as A. If the number was 11 to 30, it was evaluated as B, If the number was 31 or more, it was evaluated as C.

(5 Evaluation of Extent of Reaction

Each of the lenses prepared in Item (2) above was analyzed by ATR-type FT-IR. If the characteristic peak of —NCO at 2260 cm$^{-1}$ completely disappeared, the lens was evaluated as ○. If the peak did not disappear, it s evaluated as ×.

TABLE 1

|  |  |  | Ex. 1 | Ex. 2 | Ex. 3 | Ex. 4 | C. Ex. 1 | C. Ex. 2 | C. Ex. 3 |
|---|---|---|---|---|---|---|---|---|---|
| Polymerizable composition (% by wt.) |  | XDI | 50.7 | 52 | 43.5 | 50.7 | 50.7 | 50.7 | — |
|  | Thiol compound | A-1 | 49.3 | — | — | 49.3 | 49.3 | 49.3 | 49.3 |
|  |  | A-2 | — | 48 | — | — | — | — | — |
|  |  | A-3 | — | — | 56.5 | — | — | — | — |
|  | Catalyst | DBTE | 0.05 | 0.05 | 0.05 | 0.1 | 0.058 | — | 0.01 |
|  |  | Dibutyl triethylamine | — | — | — | — | — | 0.05 | — |
|  |  | Acetylacetone | 0.03 | 0.03 | 0.03 | 0.05 | — | — | — |
|  |  | Zelec ®UN | 0.01 | 0.1 | 0.1 | 0.1 | 0.1 | 0.1 | — |
| Result |  | Polymerization rate | 0.204 | 0.210 | 0.223 | 0.242 | Not measurable | Not measurable | 0.697 |
|  |  | Transparency | ○ | ○ | ○ | ○ | x | x | x |
|  |  | Releasability | ○ | ○ | ○ | ○ | x | x | Δ |
|  |  | Bubble | S | S | A | B | C | C | B |
|  |  | Extent of reaction | ○ | ○ | ○ | x | x | x | x |

A-1: a mixture of tetrafunctional polythiol compounds comprising 4,8-dimercaptomethyl-1,11-dimercapto-3,6,9-trithiaundecane, 4,7-dimercaptomethyl-1,11-dimercapto-3,6,9-trithiaundecane, and 5,7-dimercaptomethyl-1,11-dimercapto-3,6,9-trithiaundecane
A-2: 1,2-bis[(2-mercaptoethyl)thio]-3-mercaptopropane
A-3: pentaerythritol tetrakis(3-mercaptopropionate)

As shown in Table 1 above, the compositions of Examples 1 to 4 were overall improved in terms of polymerization rate, transparency, releasability, bubble generation, extent of reaction, and the like, as compared with the compositions of Comparative Examples 1 to 3. Accordingly, it is expected that the lenses produced in the Examples would be advantageously used because they have improved workability and are highly transparent.

The invention claimed is:

1. A polymerizable composition for a plastic lens, which comprises:
   a bi- or higher functional isocyanate compound;
   a bi- or higher functional thiol compound having at least one sulfide bond or at least one ester bond;
   a catalyst comprising a nonhalogenated tin-based catalyst, said nonhalogenated tin-based catalyst being contained in an amount of 5 ppm to 1,000 ppm based on the total weight of the isocyanate compound and the thiol compound; and
   a diketone-based low-temperature reaction rate controlling agent in an amount of 5 to 90% by weight based on the weight of the nonhalogenated tin-based catalyst.

2. The polymerizable composition for a plastic lens of claim 1, which satisfies the following Equation 1, when the changes in viscosity (Y) are measured with respect to time (X) at 10° C.:

$$\Delta \ln Y = b \times \Delta X \quad \text{Equation 1}$$

wherein $\Delta \ln Y$ is $\ln Y_X - \ln Y_0$, $Y_0$ is the initial (x =0) viscosity (cps) of the polymerizable composition at a temperature of 10° C., $Y_X$ is the viscosity (cps) of the polymerizable composition at a temperature of 10° C. after X hour(s) elapse, $\Delta X$ is from 0.01 hour to 30 hours, and b is from 0.1 hour$^{-1}$ to 0.5 hour$^{-1}$.

3. The polymerizable composition for a plastic lens of claim 1, wherein the nonhalogenated tin-based catalyst is any one of the following (i) - (vi):
   (i) a dialkyltin dicarboxylate;
   (ii) a dialkyltin dialkoxide;
   (iii) a dialkyltin dithioalkoxide;
   (iv) a dialkyltin oxide;
   (v) a dialkyltin sulfide; and
   (vi) a mixture comprising two or more of (i)-(v).

4. The polymerizable composition for a plastic lens of claim 1, wherein the diketone-based low-temperature reaction rate controlling agent comprises a diketone compound, and the diketone compound is selected from the group consisting of acetylacetone, perfluoroacetylacetone, benzoyl-2-furanoyl methane, 1,3-bis(3-pyridyl)-1,3-propanedione, benzoyltrifluoroacetone, benzoylacetone, di(4-bromo)benzoylmethane, d,d-dicamphoryl methane, 4,4-dimethoxydibenzoylmethane, 2,6-dimethyl-3,5-heptanedione, dinaphthoylmethane, dipivaloylmethane, di(perfluoro-2-propoxypropionyl)methane, 1,3-di(2-thienyl)-1,3-propanedione, 3-(trifluoroacetyl)-d-camphor, 6,6,6-trifluoro-2,2-dimethyl -3,5-hexanedione, 1,1,1,2,2,6,6,7,7,7-decafluoro-3,5-heptanedione, 6,6,7,7,8,8,8-heptafluoro -2,2-dimethyl-3,5-octanedione, 2-furyl trifluoroacetone, hexafluoroacetylacetone, 3-(heptafluorobutyryl)-d-camphor, 4,4,5,5,6,6,6-heptafluoro-1-(2-thienyl)-1,3-hexanedione, 4-methylbenzoyl-2-furanoyl methane, 6-methyl-2,4-heptanedione, 2-naphthoyl trifluoroacetone, 3-(5-phenyl-1,3,4-oxadiazol-2-yl)-2,4-pentanedione, 3-phenyl-2,4-pentanedione, pivaloyl trifluoroacetone, 1-phenyl-3-(2-thienyl)-1,3-propanedione, 3-(tert-butylhydroxymethylene) -d-camphor, trifluoroacetylacetone, 1,1,1,2,2,3,3,7,7,8,8,9,9,9-tetradecafluoro-4,6-nonanedione, 2,2,6,6-tetramethyl-3,5-heptanedione, 4,4,4-trifluoro-1-(2-naphthyl)-1,3-butanedione, 2,2,6,6-tetramethyl-3,5-octanedione, 2,2,6-trimethyl-3,5-heptanedione, 2,2,7-trimethyl-3,5-octanedione, 2-thenoyl trifluoroacetone, or a mixture thereof.

5. The polymerizable composition for a plastic lens of claim 1, wherein the diketone-based low-temperature reaction rate controlling agent comprises a diketone compound, and the diketone compound is a β-diketonate compound.

6. A process for preparing a polythiourethane-based plastic lens, which comprises:
   providing a polymerizable composition for a plastic lens comprising a bi- or higher functional isocyanate compound; a bi- or higher functional thiol compound having at least one sulfide bond or at least one ester bond; a catalyst comprising a nonhalogenated tin-based catalyst;
   and a diketone-based low-temperature reaction rate controlling agent in an amount of 5 to 90% by weight based on the weight of the nonhalogenated tin-based catalyst, wherein the nonhalogenated tin-based catalyst is employed in an amount of 5 ppm to 1,000 ppm based on the total weight of the isocyanate compound and the thiol compound; and thermally curing the polymerizable composition in a mold.

7. The process for preparing a polythiourethane-based plastic lens of claim 6, wherein the polymerizable composition is heated at a rate of 1° C./ min to 10° C./ min from an initial temperature between about 0 and about 30° C.

8. The process for preparing a polythiourethane-based plastic lens of claim 7, wherein the polymerizable composition is heated to a temperature of 100 to 150° C. and then maintained for 5 to 30 hours.

9. A polymerizable composition for a plastic lens, which comprises:

a bi- or higher functional isocyanate compound;

a bi- or higher functional thiol compound having at least one sulfide bond or at least one ester bond;

a catalyst comprising a nonhalogenated tin-based catalyst, said nonhalogenated tin-based catalyst being contained in an amount of 5 ppm to 1,000 ppm based on the total weight of the isocyanate compound and the thiol compound; and a low-temperature reaction rate controlling agent in an amount of 5 to 90% by weight based on the weight of the nonhalogenated tin-based catalyst, wherein the polymerizable composition satisfies the following Equation 1, when the changes in viscosity (Y) are measured with respect to time (X) at 10° C.:

$$\Delta \ln Y = b \times \Delta X \qquad \text{Equation 1}$$

wherein $\Delta \ln Y$ is $\ln Y_X - \ln Y_0$, $Y_0$ is the initial (x=0) viscosity (cps) of the polymerizable composition at a temperature of 10° C., $Y_X$ is the viscosity (cps) of the polymerizable composition at a temperature of 10° C. after X hour(s) elapse, $\Delta X$ is from 0.01 hour to 30 hours, and b is from 0.1 hour$^{-1}$ to 0.5 hour$^{-1}$.

10. The polymerizable composition for a plastic lens of claim 9, wherein the low-temperature reaction rate controlling agent reduces the reaction rate of the isocyanate compound and the thiol compound at a temperature of 0° C. to 50° C.

11. The polymerizable composition for a plastic lens of claim 10, wherein the low-temperature reaction rate controlling agent comprises a diketone-based compound.

12. The polymerizable composition for a plastic lens of claim 9, wherein the isocyanate compound is selected from the group consisting of 1,3-bis(isocyanatomethyl)cyclohexane, 1,4-bis(isocyanatomethyl)cyclohexane, bis (4-isocyanatocyclohexyl)methane, bis(isocyanatomethyl)-bicyclo[2.2.1]heptane, isophorone diisocyanate, m-xylene diisocyanate, hexamethylene diisocyanate, pentamethylene diisocyanate, toluene diisocyanate, or a mixture thereof.

13. The polymerizable composition for a plastic lens of claim 12, wherein the isocyanate compound is m-xylene diisocyanate, 1,3-bis(isocyanatomethyl)cyclohexane, or a mixture thereof.

14. The polymerizable composition for a plastic lens of claim 9, wherein the bi- or higher functional thiol compound having at least one sulfide bond is selected from the group consisting of 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 4-mercaptomethyl-1,8-dimercapto-3,6-dithiooctane, bis(mercaptoethyl) sulfide, 2,5-bis(mercaptomethyl)-1,4-dithiane, 1,1,3,3-tetrakis(mercaptomethylthio) propane, 4,6-bis(mercaptomethylthio)-1,3-dithiane, 2-(2,2-bis(mercaptomethylthio)ethyl)-1,3-dithiaethane, 1,2-bis[(2-mercaptoethyl)thio]-3-mercaptopropane, or a mixture thereof.

15. The polymerizable composition for a plastic lens of claim 9, wherein the bi- or higher functional thiol compound having at least one ester bond is selected from the group consisting of trimethylpropane tri(3-mercaptoacetate), trimethylpropane tri (3-mercaptopropionate), pentaerythritol tetrakis(2-mercaptoacetate), pentaerythritol tetrakis (3-mercaptopropionate), dipentaerythritol hexa(3-mercaptoacetate), dipentaerythritol hexa (3-mercaptopropionate), or a mixture thereof.

16. The polymerizable composition for a plastic lens of claim 14, wherein the thiol compound is selected from the group consisting of 4,8-dimercaptomethyl -1,11-dimercapto-3,6,9-trithiaundecane, 4, 7-dimercaptomethyl-1, 11-dimercapto-3 ,6, 9-trithiaundecane, 5,7-dimercaptomethyl-1,11-dimercapto-3,6,9-trithiaundecane, or a mixture thereof.

17. The polymerizable composition for a plastic lens of claim 3, wherein
(ii) the dialkyltin dicarboxylate is selected from the group consisting of dimethyltin diacetate, dibutyltin dioctanoate, and dibutyltin dilaurate;
(ii) the dialkyltin dialkoxide is selected from the group consisting of dibutyltin dibutoxide and dioctyltin dibutoxide;
(iii) the dialkyltin dithioalkoxide is dibutyltin di(thiobutoxide);
(iv) the dialkyltin oxide is selected from the group consisting of di(2-ethylhexyl)tin oxide, dioctyltin oxide, and bis(butoxy dibutyltin) oxide; and
(v) the dialkylsulfide is dibutyl sulfide.

* * * * *

UNITED STATES PATENT AND TRADEMARK OFFICE
CERTIFICATE OF CORRECTION

PATENT NO. : 10,865,307 B2
APPLICATION NO. : 15/887177
DATED : December 15, 2020
INVENTOR(S) : Hong et al.

It is certified that error appears in the above-identified patent and that said Letters Patent is hereby corrected as shown below:

On the Title Page

Item (30) Foreign Application Priority Data, delete "Mar. 2, 2017" and insert --Feb. 3, 2017-- therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*